(12) United States Patent
Shah (10) Patent No.: US 11,169,495 B2
(45) Date of Patent: Nov. 9, 2021

(54) METHODS FOR PROVISIONING AN INDUSTRIAL INTERNET-OF-THINGS CONTROL FRAMEWORK OF DYNAMIC MULTI-CLOUD EVENTS AND DEVICES THEREOF

(71) Applicant: Wipro Limited, Bangalore (IN)

(72) Inventor: Vikas Shah, Phoenixville, PA (US)

(73) Assignee: Wipro Limited, Bangalore (IN)

( * ) Notice: Subject to any disclaimer, the term of this patent is extended or adjusted under 35 U.S.C. 154(b) by 700 days.

(21) Appl. No.: 15/420,397

(22) Filed: Jan. 31, 2017

(65) Prior Publication Data

US 2018/0217570 A1    Aug. 2, 2018

(51) Int. Cl.
| | |
|---|---|
| *G05B 19/042* | (2006.01) |
| *G06Q 10/06* | (2012.01) |
| *G06F 9/50* | (2006.01) |
| *H04L 29/08* | (2006.01) |

(52) U.S. Cl.
CPC ......... *G05B 19/042* (2013.01); *G06F 9/5072* (2013.01); *G06Q 10/06* (2013.01); *H04L 67/12* (2013.01); *G05B 2219/35499* (2013.01)

(58) Field of Classification Search
CPC ........ G05B 19/042; G05B 2219/35499; G06Q 10/06; G06F 9/5072; H04L 67/12
See application file for complete search history.

(56) References Cited

U.S. PATENT DOCUMENTS

| | | | |
|---|---|---|---|
| 10,649,449 B2* | 5/2020 | Bell | G05B 23/024 |
| 10,733,865 B2* | 8/2020 | Lundy | G08C 17/02 |
| 2015/0264117 A1 | 9/2015 | Kasturi et al. | |
| 2015/0281355 A1* | 10/2015 | Maturana | G06F 9/548 |
| | | | 709/202 |
| 2016/0261458 A1* | 9/2016 | Huang | H04L 43/16 |
| 2016/0323143 A1* | 11/2016 | Kim | G06F 3/0629 |
| 2016/0366187 A1* | 12/2016 | Kamble | H04L 63/20 |

(Continued)

OTHER PUBLICATIONS

Leusse, "Toward Governance Of Cross-Cloud Application Deployment", Journal, Mar. 2, 2012, pp. 1-12.

(Continued)

*Primary Examiner* — Patrice L Winder
*Assistant Examiner* — Angela M Widhalm De Rodrig
(74) *Attorney, Agent, or Firm* — Finnegan, Henderson, Farabow, Garrett & Dunner, LLP (57) ABSTRACT

Methods, non-transitory computer readable media, and Industrial Internet-of-Things (IIoT) management apparatuses that generate event data based on an overall event comprising a plurality of dynamic multi-cloud events. Each of the events is associated with at least one of a plurality of types of IIoT resource devices or a plurality of IIoT participant devices. A current overall event hierarchy of the events is established, derived, or introduced based on one of a plurality of predefined hierarchies. A relationship between one or more socio environment and economic factors and each of the events is identified. One or more controls for each of the events are derived based on the identified relationship. Action plan data is generated for an execution in a multi-cloud environment based on the events, the derived controls, and a profiled participant role associated with one or more of the participant devices. The action plan data is distributed in the environment.

17 Claims, 4 Drawing Sheets

(56) References Cited

U.S. PATENT DOCUMENTS

| | | | |
|---|---|---|---|
| 2017/0006135 A1* | 1/2017 | Siebel | H04L 67/02 |
| 2017/0006141 A1* | 1/2017 | Bhadra | H04W 84/18 |
| 2017/0060574 A1* | 3/2017 | Malladi | G06F 8/70 |
| 2017/0201585 A1* | 7/2017 | Doraiswamy | H04L 41/0806 |
| 2017/0235783 A1* | 8/2017 | Chen | H04L 41/0893 |
| | | | 707/691 |
| 2017/0323089 A1* | 11/2017 | Duggal | H04W 4/00 |
| 2018/0027006 A1* | 1/2018 | Zimmermann | H04L 63/0245 |
| | | | 726/11 |
| 2018/0060159 A1* | 3/2018 | Justin | G06F 11/0787 |
| 2018/0131765 A1* | 5/2018 | Puleston | G06K 7/10366 |
| 2019/0052549 A1* | 2/2019 | Duggal | H04L 41/5019 |
| 2020/0225655 A1* | 7/2020 | Cella | G05B 23/0264 |

OTHER PUBLICATIONS

"An Enterprise-Grade Cloud Management Platform To Enable A Self-Service, On-Demand IT Operating Model For The Cloud Empowered Enterprise", Jan. 2014, pp. 1-15, CA Technologies.

Chamness et al., "Japan Well Positioned To Support IoT And The Industry", Feb. 1, 2016, pp. 1-5, SEMI.

Puhringer, "Japan's Take On The Industrial Internet Of Things", Article, Jan. 6, 2016, pp. 1-4, Hilscher.

"Discharge Of Chemical Oxygen Demand (COD) Particles In China From 2010 To 2015 (In 1,000 Tons)", Mar. 12, 2016, pp. 1-4, Statista.

* cited by examiner

METHODS FOR PROVISIONING AN INDUSTRIAL INTERNET-OF-THINGS CONTROL FRAMEWORK OF DYNAMIC MULTI-CLOUD EVENTS AND DEVICES THEREOF

This technology generally relates to the industrial internet-of-things (IIoT) and, more particularly, to methods for providing an industrial internet of things control framework for dynamic multi-cloud events.

BACKGROUND

The Industrial Internet of things (IIoT) relates to the use of IIoT technologies in manufacturing where devices and resources from different manufacturers as well as multiple locations need to work together. Recently, the multi-clouds have emerged as a mechanism to utilize, monitor, and control IIoT devices and their corresponding resources and corresponding synchronization among these IIoT devices and their corresponding resources to accomplish different manufacturing tasks for overall events or products. The use of the multi-clouds has helped to facilitate management and completion of these overall events or products, however there are still numerous shortcomings with prior existing technologies for managing IIoT devices and their corresponding resources in a multi-cloud environment.

For example, effective automation of management and control between different aspects of an overall event on different clouds remains an issue with prior existing technologies for managing IIoT devices and their corresponding resources. Additionally, there is an increasing need for and utilization of synchronous events as well as a need for coordination of asynchronous events for overall events for IIoT devices and their corresponding resources. Further, there is also a need for managing IIoT devices and their corresponding resources to monitor and make adjustments for socio economic and environmental concerns and impacts across the cloud, during the management of an overall event, such as a product or other project.

SUMMARY

A method for providing an Industrial Internet-of-Things (IIoT) control framework for dynamic multi-cloud events includes generating, by a cloud event identification and publishing manager (EIPM) in an IIoT management apparatus, event data based on a received overall event comprising a plurality of dynamic multi-cloud events. Each of the plurality of dynamic multi-cloud events is associated with at least one of a plurality of types of IIoT resource devices or a plurality of IIoT participant devices. A current overall event hierarchy for the plurality of dynamic multi-cloud events in the overall event data is established, by a heterogeneous multi cloud event controls and selection engine (ECSE) in the IIoT management apparatus, based on one of a plurality of overall event hierarchies. A relationship between one or more socio environment and economic factors and each of the plurality of dynamic multi-cloud events is identified, by an IIoT cloud event relationship and ignition engine (icERIE) in the IIoT management apparatus. One or more controls for each of the plurality of dynamic multi-cloud events is derived, by a socio environment and economic factorization unit (S2EU) in the IIoT management apparatus, based on the identified relationship between the one or more socio environment and economic factors and each of the plurality of dynamic multi-cloud events. Action plan data for an action plan in a multi-cloud environment is generated, by an IIoT cloud governance model manager (icGMM) in the IIoT management apparatus, based on the plurality of dynamic multi-cloud events, the derived one or more controls for each of the plurality of dynamic multi-cloud events, and a profiled participant role associated with one or more of the plurality of IIoT participant devices. The generated action plan data for the action plan is distributed in the multi-cloud environment, by the cloud event identification and publishing manager (EIPM) in the IIoT management apparatus.

An Industrial Internet-of-Things (IIoT) management apparatus comprising a memory comprising programmed instructions stored thereon and coupled to the one or more processors which are configured to be capable of executing the stored programmed instructions to generate by a cloud event identification and publishing manager (EIPM) event data based on a received overall event comprising a plurality of dynamic multi-cloud events. Each of the plurality of dynamic multi-cloud events is associated with at least one of a plurality of types of IIoT resource devices or a plurality of IIoT participant devices. A current overall event hierarchy for the plurality of dynamic multi-cloud events in the overall event data is established by a heterogeneous multi cloud event controls and selection engine (ECSE) based on one of a plurality of overall event hierarchies. A relationship between one or more socio environment and economic factors and each of the plurality of dynamic multi-cloud events is identified by an IIoT cloud event relationship and ignition engine (icERIE). One or more controls for each of the plurality of dynamic multi-cloud events is derived by a socio environment and economic factorization unit (S2EU) based on the identified relationship between the one or more socio environment and economic factors and each of the plurality of dynamic multi-cloud events. Action plan data for an action plan in a multi-cloud environment is generated, by an IIoT cloud governance model manager (icGMM) based on the plurality of dynamic multi-cloud events, the derived one or more controls for each of the plurality of dynamic multi-cloud events, and a profiled participant role associated with one or more of the plurality of IIoT participant devices. The generated action plan data for the action plan is distributed in the multi-cloud environment by the cloud event identification and publishing manager (EIPM).

A non-transitory computer readable medium having stored thereon instructions for providing an Industrial Internet-of-Things (IIoT) control framework for dynamic multi-cloud events comprising executable code which when executed by one or more processors, causes the processors to generate by a cloud event identification and publishing manager (EIPM) event data based on a received overall event comprising a plurality of dynamic multi-cloud events. Each of the plurality of dynamic multi-cloud events is associated with at least one of a plurality of types of IIoT resource devices or a plurality of IIoT participant devices. A current overall event hierarchy for the plurality of dynamic multi-cloud events in the overall event data is established by a heterogeneous multi cloud event controls and selection engine (ECSE) based on one of a plurality of overall event hierarchies. A relationship between one or more socio environment and economic factors and each of the plurality of dynamic multi-cloud events is identified by an IIoT cloud event relationship and ignition engine (icERIE). One or more controls for each of the plurality of dynamic multi-cloud events is derived by a socio environment and economic factorization unit (S2EU) based on the identified relationship between the one or more socio environment and economic factors and each of the plurality of dynamic multi-cloud events. Action plan data for an action plan in a multi-cloud environment is generated, by an IIoT cloud governance model manager (icGMM) based on the plurality of dynamic multi-cloud events, the derived one or more controls for each of the plurality of dynamic multi-cloud events, and a profiled participant role associated with one or more of the plurality of IIoT participant devices. The generated action plan data for the action plan is distributed in the multi-cloud environment by the cloud event identification and publishing manager (EIPM).

DETAILED DESCRIPTION

Figure 1:
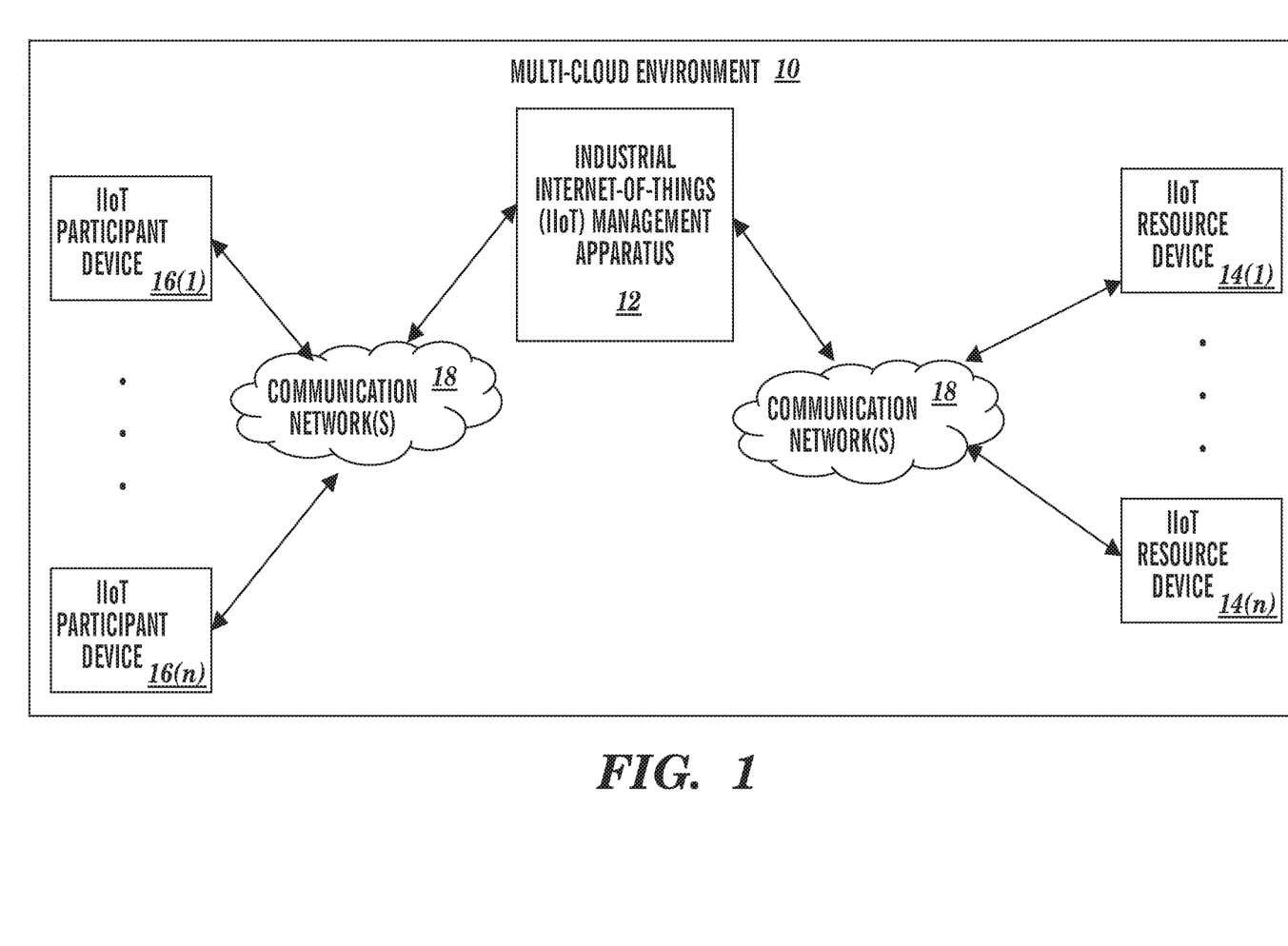
FIG. 1 is a block diagram of an example of an Industrial Internet-of-Things (IIoT) management system in a cloud environment.
Figure 2:
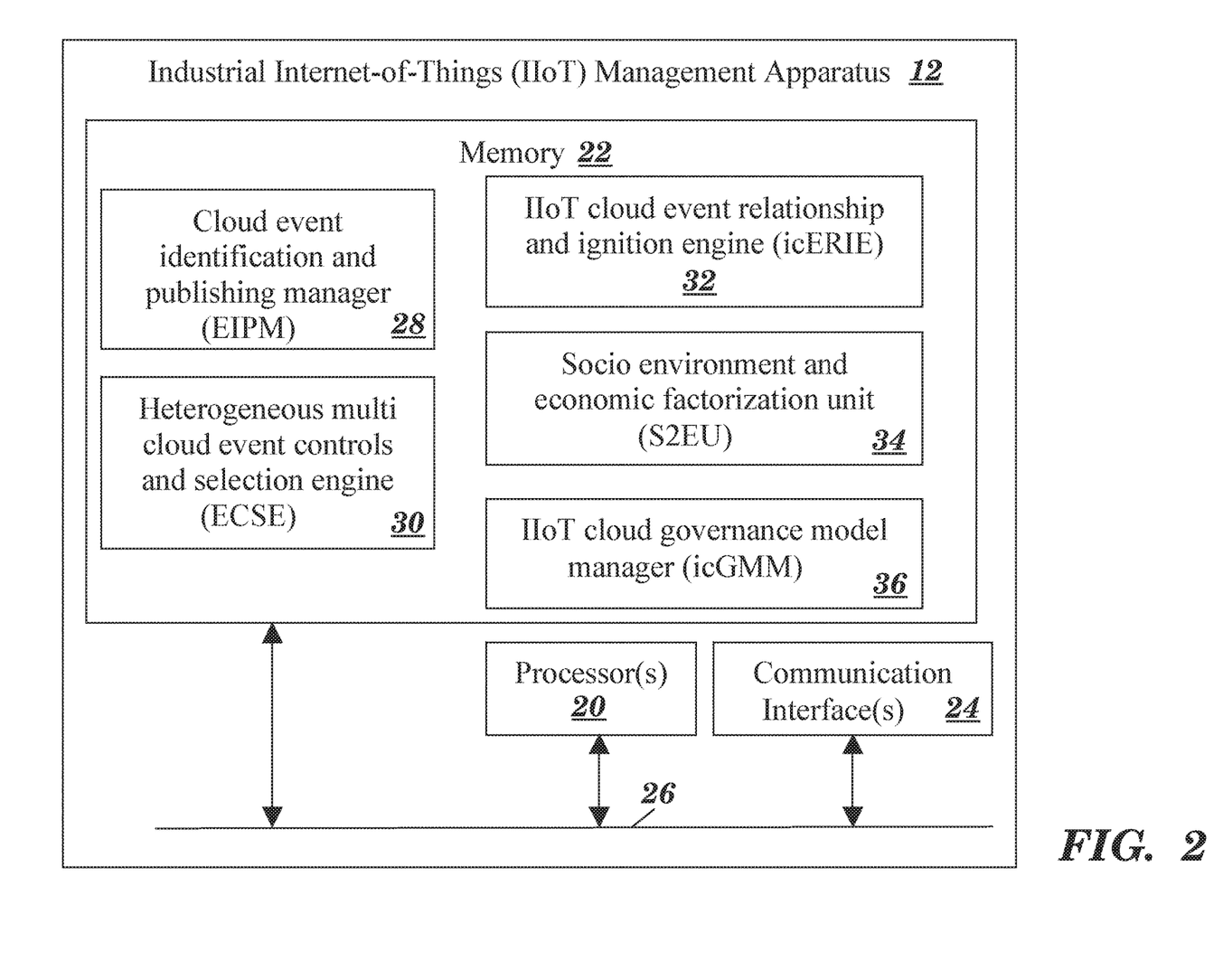
FIG. 2 is a block diagram of an example of the IIoT management apparatus shown in FIG. 1.
Figure 3:
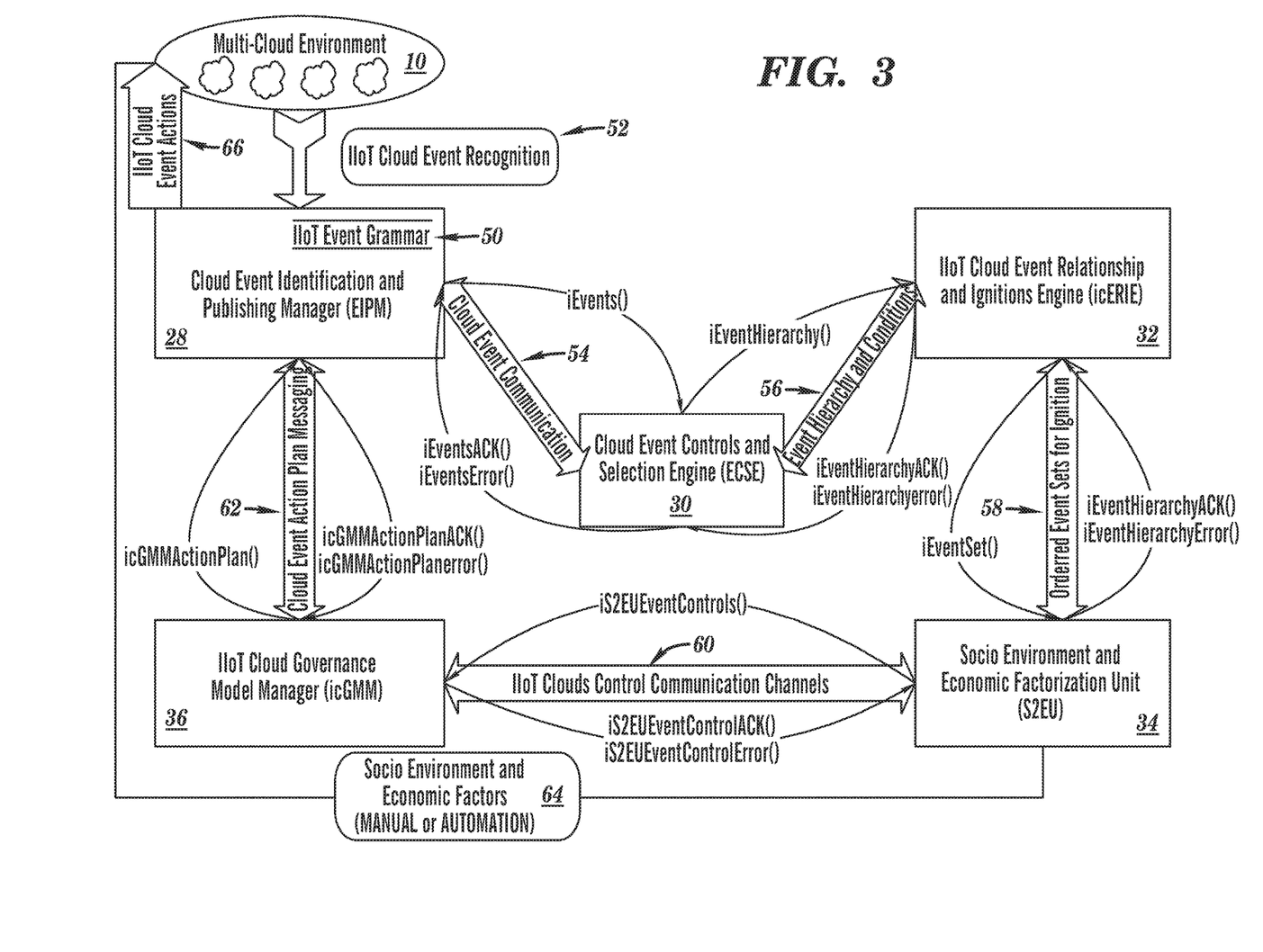
FIG. 3 is a functional block diagram of an example of a portion of the IIoT management apparatus providing an industrial internet of things control framework for dynamic multi-cloud events based on one or more socio economic and environment factors.

A multi-cloud environment 10 with an exemplary Industrial Internet-of-Things (IIoT) management apparatus 12 is illustrated in FIGS. 1-3. In this particular example, the multi-cloud environment 10 includes the IIoT management apparatus 12, a plurality of IIoT resource devices 14(1)-14(n), and a plurality of IIoT participant devices 16(1)-16(n) coupled together by one or more communication network(s) 18, although the environment could include other types and/or numbers of other systems, devices, components, and/or other elements coupled together via other topologies. By way of example only, the environment may comprise an IIoT management system with one or more of the IIoT management apparatuses. Additionally, the multi-cloud environment 10 may include other types and/or numbers of network devices which are well known to those of ordinary skill in the art and thus will not be described herein. Further, the multi-cloud environment 10 may comprise a plurality of different clouds which may be utilized for an overall event, such as a supplier cloud, vendor cloud, government cloud, and billing cloud, shipping company cloud by way of example only, although the multi-cloud environment could comprise other types and/or numbers of clouds. For ease of illustration, the plurality of IIoT resource devices 14(1)-14(n) and a plurality of IIoT participant devices 16(1)-16(n) are intended to represent by way of example only the different types and/or numbers of devices on the different clouds interacting with the IIoT management apparatus 12. This technology provides a number of advantages including methods, non-transitory computer readable media, and IIoT management apparatuses that provide an industrial internet of things control framework for dynamic multi-cloud events based on one or more socio economic and environment factors.

Referring to FIGS. 1-3, the IIoT management apparatus 12 of the multi-cloud environment 10 may perform any number of functions including managing an industrial internet of things control framework for dynamic multi-cloud events. The IIoT management apparatus 12 in this example includes one or more processors 20, a memory 22, and a communication interface 24, which are coupled together by a bus 26 or other communication link, although the IIoT management apparatus 12 can include other types and/or numbers of systems, devices, components, and/or elements in other configurations.

The processor(s) 20 of the IIoT management apparatus 12 may execute programmed instructions for the any number of the functions identified and described by way of the examples herein. The processor(s) 20 may include one or more CPUs or general purpose processors with one or more processing cores, for example, although other types of processor(s) can also be used.

The memory 22 of the IIoT management apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 20, can be used for the memory 22.

Accordingly, the memory of the IIoT management apparatus 12 can store one or more applications that can include computer executable instructions that, when executed by the IIoT management apparatus, cause the IIoT management apparatus to perform actions, such as to manage an industrial internet of things control framework for dynamic multi-cloud events, for example, and to perform other actions described and illustrated in the examples herein with reference to FIGS. 1-4. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the IIoT management apparatus 12 itself, may be located in virtual server(s) running in a cloud-based computing environment rather than being tied to one or more specific physical network computing devices. Also, the application(s) may be running in one or more virtual machines (VMs) executing on the IIoT management apparatus 12. Additionally, in one or more embodiments of this technology, virtual machine(s) running on the IIoT management apparatus 12 may be managed or supervised by a hypervisor.

In this particular example, the memory 22 of the IIoT management apparatus 12 may include a cloud event identification and publishing manager (EIPM) 28, a heterogeneous multi cloud event controls and selection engine (ECSE) 30, an IIoT cloud event relationship and ignition engine (icERIE) 32, a socio environment and economic factorization unit (S2EU) 34, and a multi-cloud IIoT cloud governance model manager (icGMM) 36, although the memory 22 can include other types and/or numbers of policies, modules, databases, or applications, for example.

The cloud event identification and publishing manager (EIPM) 28 may comprise data and/or one or more programmed instructions for a variety of operations and/or other functions as illustrated and described herein, such as creating and publishing events. Events may be created and published dynamically by the cloud event identification and publishing manager (EIPM) 28 based on the ownership and authorization. The cloud event identification and publishing manager (EIPM) 28 may also provide streamlining, variations, and diversifications necessary to the events for IIoT cloud. Moreover, the grammar to define and generate events may be centralized in an IIoT Event Grammar module 50 in the cloud event identification and publishing manager (EIPM) 28. Further, the cloud event identification and publishing manager (EIPM) 28 may provide event level abstractions and reusability.

The heterogeneous multi cloud event controls and selection engine (ECSE) 30 may comprise data and/or one or more programmed instructions for a variety of operations and/or other functions as illustrated and described herein, such as correlating events and their constraints. The heterogeneous multi cloud event controls and selection engine (ECSE) 30 may place the levels of events and their controls for IIoT. The correlations may be conditional and the conditions can be imposed to participants, their roles, associated cloud resource or control, and/or based on statistical paradigms identified in cloud (dimensional data) by way of example only. The heterogeneous multi cloud event controls and selection engine (ECSE) 30 may generate, update and/or manage the overall event hierarchies (or set of events in specific order). In this example, overall event hierarchies may also be introduced and/or updated utilizing the heterogeneous multi cloud event controls and selection engine (ECSE) 30.

The IIoT cloud event relationship and ignition engine (icERIE) 32 may comprise data and/or one or more programmed instructions for a variety of operations and/or other functions as illustrated and described herein, such as to define the relationship between the socio environment and economic factors and events and their associated hierarchies. The IIoT cloud event relationship and ignition engine (icERIE) 32 may determine the appropriate event or events to ignite based on the specific relationship and identifications of the one or more conditions.

The socio environment and economic factorization unit (S2EU) 34 may comprise data and/or one or more programmed instructions for a variety of operations and/or other functions as illustrated and described herein, such as to define potential factors to be considered in overall configuration and utilization of IIoT and their clouds (including entire supply-chain of products and services). The socio environment and economic factorization unit (S2EU) 34 may generate conditions for the event hierarchies based on a stored or otherwise input precedence of the factors. The socio environment and economic factorization unit (S2EU) 34 may generate notifications and provides manual interventions to change the course of event hierarchy, if necessary. In this particular example, the controls may be defined within socio environment and economic factorization unit (S2EU) 34 for IIoT multi-cloud.

The IIoT cloud governance model manager (icGMM) 36 may comprise data and/or one or more programmed instructions for a variety of operations and/or other functions as illustrated and described herein, such as to define the roles of participants (including devices and resources) within the cloud and their authorizations. The IIoT cloud governance model manager (icGMM) 36 may also generate and/or update the profile each of the participants at one or more of the IIoT participant devices 16(1)-16(n) within the multi-cloud environment 10. The association between the participants, their roles, and events may be configured, mapped, and managed in the IIoT cloud governance model manager (icGMM) 36.

The communication interface 24 of the IIoT management apparatus 12 in this example operatively couples and communicates between the IIoT management apparatus 12, the IIoT resource devices 14(1)-14(n), and/or the IIoT participant devices 16(1)-16(n), which are all coupled together by the communication network(s) 18 over the multi-cloud environment 10, although other types and numbers of communication networks or systems with other types and/or numbers of connections and configurations to other devices and/or elements can also be used.

By way of example only, the communication network(s) 18 can include local area network(s) (LAN(s)) and/or wide area network(s) (WAN(s)), and can use TCP/IP over Ethernet and industry-standard protocols, although other types and numbers of protocols and/or communication networks can be used. The communication network(s) 18 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) can also include direct connection(s), such as when the IIoT management apparatus 12 or one or more IIoT resource devices 14(1)-14(n) operate as virtual instances on the same physical machine.

While the IIoT management apparatus 12 is illustrated in this example as comprising a single device, the IIoT management apparatus 12 in other examples may include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, and/or other hardware or software components of one or more other devices included in the IIoT management apparatus 12.

Additionally, one or more of the devices that together comprise the IIoT management apparatus 12 in other examples can be standalone devices or integrated with one or more other devices or apparatuses. Moreover, one or more of the devices of the IIoT management apparatus 12 in these examples may be in a same or a different communication network including one or more public, private, or multi-cloud networks in environment 10, for example.

In this particular example, the IIoT resource devices 14(1)-14(n) are intended to represent various different servers and/or other devices that may be providing one or more IIoT resources in different clouds of the multi-cloud environment 10. Each of the IIoT resource devices 14(1)-14(n) in this example includes one or more processors, a memory, and a communication interface, which are coupled together by a bus, queues, pipeline, or other communication link including by way of example only Wi-Fi, WiMAX, 4G and/or other wireless communication interfaces, although other numbers and types of network devices could be used. The IIoT resource devices 14(1)-14(n) may interact with the IIoT management apparatus 12 and/or one or more of the IIoT participant devices 16(1)-16(n) via the communication network(s) 18 according to the HTTP-based application RFC protocol, for example. Various applications may be operating on the IIoT resource devices 14(1)-14(n). The IIoT resource devices 14(1)-14(n) may be hardware or software or may represent a system with multiple servers in a pool, which may include internal or external networks.

Although the IIoT resource devices 14(1)-14(n) are illustrated as single devices, one or more actions of each of the IIoT resource devices 14(1)-14(n) may be distributed across one or more distinct network computing devices that together comprise one or more of the IIoT resource devices 14(1)-14(n). Moreover, the IIoT resource devices 14(1)-14(n) are not limited to a particular configuration. Thus, the IIoT resource devices 14(1)-14(n) may contain a plurality of network computing devices that operate using a master/slave approach in active-active configuration, whereby one of the network computing devices of the IIoT resource devices 14(1)-14(n) operate to manage and/or otherwise coordinate operations of the other network computing devices. The IIoT resource devices 14(1)-14(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged. In this example, the one or more IIoT resource devices 14(1)-14(n) may operate within one or more multi-clouds coupled to the IIoT management apparatus 12.

In this particular example, the IIoT participant devices 16(1)-16(n) are intended to represent various different computing devices for diversified IIoT participants in different clouds of the multi-cloud environment 10. The IIoT participant devices 16(1)-16(n) in this example may include any type of computing device, such as sensors, actuators, radio frequency identification device, robot devices, mobile computing devices, desktop computing devices, laptop computing devices, tablet computing devices, virtual machines (including cloud-based computers), or the like. Each of the IIoT participant devices 16(1)-16(n) in this example includes a processor, a memory, and a communication interface, which are coupled together by a bus, queues, pipelines, or other communication link including wireless communication interfaces, although other numbers and/or types of network devices could be used. The IIoT participant devices 16(1)-16(n) may further include a display device, such as a display screen or touchscreen, and/or an input device, such as a keyboard for example. Again, the technology disclosed herein is not to be construed as being limited to a single environment and other configurations and architectures are also envisaged. In this example, the one or more IIoT participant devices 16(1)-16(n) may operate within one or more multi-clouds coupled to the IIoT management apparatus 12.

Although the exemplary multi-cloud environment 10 comprising multiple clouds and with the IIoT management apparatus 12, IIoT resource devices 14(1)-14(n), IIoT participant devices 16(1)-16(n), and communication network(s) 18 are described and illustrated herein, other types and numbers of systems, devices, components, platforms, and elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the multi-cloud environment 10, such as the IIoT management apparatus 12, IIoT resource devices 14(1)-14(n), and/or IIoT participant devices 16(1)-16(n), for example, may be configured to operate as virtual instances on the same physical machine. In other words, one or more of the IIoT management apparatus 12, IIoT resource devices 14(1)-14(n), or participant devices 16(1)-16(n) may operate on the same physical device rather than as separate devices communicating through communication network(s). Additionally, there may be more or fewer IIoT management apparatuses 12, IIoT resource devices 14(1)-14(n), and/or participant devices 16(1)-16(n) than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An exemplary method for providing an industrial internet-of-things control framework for dynamic multi-cloud events based on one or more socio economic and environment factors will now be described with reference to FIGS. 1-4. In particular, the functional block diagram of the IIoT management apparatus 12 in FIG. 3 illustrates examples of the interactions between two or more of the heterogeneous multi cloud event controls and selection engine (ECSE) 30, the IIoT cloud event relationship and ignition engine (ic-ERIE) 32, the socio environment and economic factorization unit (S2EU) 34, and the multi-cloud IIoT cloud governance model manager (icGMM) 36 including either an acknowledgement or error of each communication as well known to those of ordinary skill in the art during an example of this process which will be illustrated and described in greater detail below.

Figure 4:
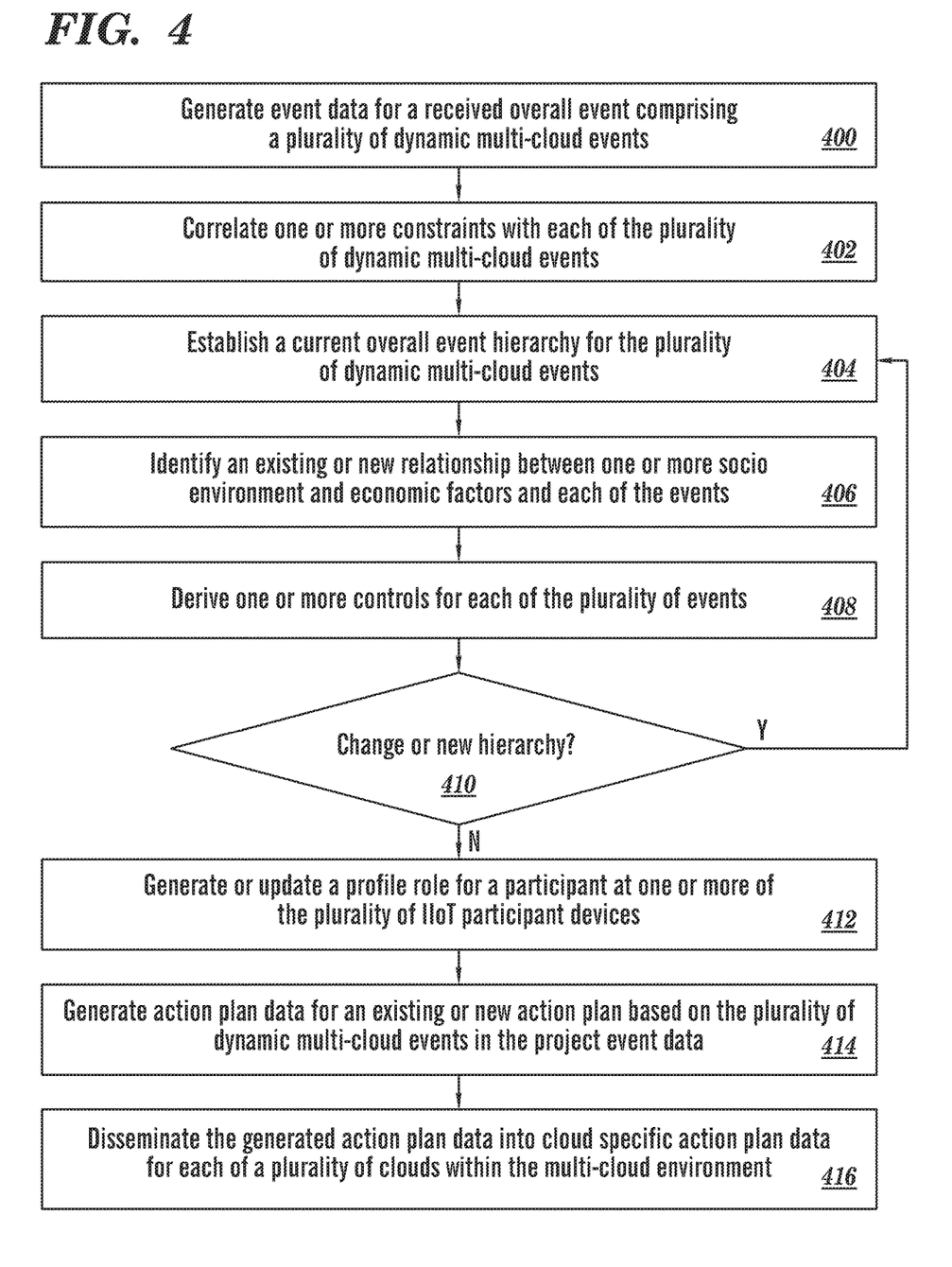
FIG. 4 is a flowchart of an exemplary method for providing an industrial internet of things control framework for dynamic multi-cloud events based on one or more socio economic and environment factors.

Referring more specifically to FIGS. 3-4, in step 400 in this example, the cloud event identification and publishing manager (EIPM) 28 in the IIoT management apparatus 12 may generate event data for a received overall event or an IIoT cloud event recognition 52 as shown by way of example in FIG. 3 comprising a plurality of dynamic multi-cloud events for actual cloud operations on one or more clouds in the multi-cloud environment 10. By way of example only, the IIoT management apparatus 12 may provide an interface or other input mechanism to enable creation of the plurality of dynamic multi-cloud events for the received overall event, although other manners for creating the plurality of dynamic multi-cloud events may be used, such as retrieving stored sets of events based on the particular type of a plurality of types of overall events or overall events by way of example only. Each of the generated plurality of dynamic multi-cloud events may be associated by the cloud event identification and publishing manager (EIPM) 28 in the IIoT management apparatus 12 for example with at least one of a plurality of types of IIoT resources at one or more of the IIoT resource devices 14(1)-14(n) or one or more of the IIoT participant devices 16(1)-16(n) in one or more clouds in the multi-cloud environment, although the events could have other types and/or numbers of associations. Additionally, the cloud event identification and publishing manager (EIPM) 28 in the IIoT management apparatus 12 may perform other types of processing on the generated plurality of dynamic multi-cloud events, such as using an iEvent Grammar module 50 to correct and harmonize or otherwise adjust grammar in each of the generated events. The IIoT management apparatus 12 may also allow operations, such as to create, delete, update, and/or modify by way of example only, with respect to the plurality of dynamic multi-cloud events.

Example of a Use Case of this Technology

By way of example only, a use case is set forth below for a overall event (E1) for the manufacture of 10,000 shoes of a type "X" to help illustrate aspects of this example of the technology. Based on this received overall event E1, the cloud event identification and publishing manager (EIPM) 28 in the IIoT management apparatus 12 may generate event data for the following dynamic multi-cloud events on one or more different clouds, such as a Company Cloud, Supplier Cloud, Vendor Cloud, Government Cloud, and Shipping Company Cloud in the multi-cloud environment 10, as set forth in the events below:

E1-A: Assign Company "C" in China [Conditions of Socio Environment and Economic Factorization Unit (S2EU) 34 on Vendor Cloud];
  E1-A-1: Transition to Company "C" Cloud to set Manufacturing Initiation;
  E1-A-2: Identify start and completion dates;
  E1-A-3: Set configuration, controls, and status of devices for manufacturing product [Event Hierarchy "E2"];
  E1-A-4: Run manufacturing process from 8:00 AM to 5:00 PM [Supplier Cloud to Vendor Cloud Collaborative Event];
  E1-A-5: Track government (China) regulations to operate devices [Event Hierarchy "E3": eGov of China Cloud to Vendor Cloud event Hierarchy];
  E1-A-6: Monitor devices for accuracy and fault based on standards defined by the vendors [Conditions by Socio Environment and Economic Factorization Unit (S2EU) 34: to Vendor Cloud in correlation to Supplier Cloud];
  E1-A-7: Identify fault [Event Hierarchy "E4" for Fault type {F1, F9, F12}];
  E1-A-8: Completion of the manufacturing process [Vendor Cloud Event];
  E1-A-9: Confirmation of completion [Vendor cloud to Supplier Cloud Event];
  E1-A-10: Assign to Ship Company "S" [Event Hierarchy "E5": Supplier Cloud to Shipping Company Cloud Collaboration Event].

Examples of Possible Variations to this Use Case

Event 1-B: Assign to Company "M" in Mexico;
  E1-B-5: Track government (Mexico) regulations to operate devices [Event Hierarchy "E6"];
  E1-B-10: Assign Airline "A" [Event Hierarchy "E7"]

In the use case example above and the variation, Event 1-A and the variation Event 1-B are very similar except for the governance and regulations of different countries and different shipping methods which can impact the hierarchy and generated action plan data implemented by the IIoT management apparatus 12.

In step 402, the Heterogeneous Multi Cloud Event Controls and Selection Engine (ECSE) 30 of the IIoT management apparatus 12 may receive for example via cloud event communications 54 the cloud event identification and publishing manager (EIPM) 28 as shown in FIG. 3. The Heterogeneous Multi Cloud Event Controls and Selection Engine (ECSE) 30 of the IIoT management apparatus 12 may correlate one or more constraints with each of the plurality of dynamic multi-cloud events, such as events E1-A-1 to E1-A-10 in the use case example, based on one or more obtained conditions in the received overall event data, although other manners for correlating constraints based on retrieved condition and corresponding constraint data can be used. The correlations by the Heterogeneous Multi Cloud Event Controls and Selection Engine (ECSE) 30 of the IIoT management apparatus 12 can be conditional and the conditions can be imposed on participants, roles of the participants, and/or cloud resources by way of example only. The one or more constraints may comprise one or more government regulatory constraints, such as government regulatory constraints in terms of load that each ship, airplane, truck, etc. can carry due to safety of other vehicles, although other types and/or numbers of constraints may be used.

In step 404, the Heterogeneous Multi Cloud Event Controls and Selection Engine (ECSE) 30 of the IIoT management apparatus 12 may also establish, update or otherwise manage a current overall event hierarchy for the plurality of dynamic multi-cloud events in the overall event data based on one of a plurality of predefined and stored overall event hierarchies corresponding to one of a plurality of types of overall events or overall events. By way of example in the use case above, the Heterogeneous Multi Cloud Event Controls and Selection Engine (ECSE) 30 of the IIoT management apparatus 12 may based on the overall event E1-A establish the hierarchy for the generated events E1-A-1 to E1-A-10. This particular hierarchy may be defined by the Heterogeneous Multi Cloud Event Controls and Selection Engine (ECSE) 30 of the IIoT management apparatus 12 based on one of a plurality of predefined and stored hierarchies for this type of overall event E1-A based on the particular synchronous and/or asynchronous sequence or sequences that need(s) to be performed, although other manners for establishing one or more hierarchies can be used.

In step 406, the IIoT Cloud Event Relationship and Ignition Engine (icERIE) 32 of the IIoT management apparatus 12 may for example communicate via event hierarchy and conditions channels 56 with the Heterogeneous Multi Cloud Event Controls and Selection Engine (ECSE) 30 as shown in FIG. 3. Based on these and other communications as illustrated and described herein, the IIoT Cloud Event Relationship and Ignition Engine (icERIE) 32 of the IIoT management apparatus 12 may identify any existing and/or new relationships between the socio environment and economic factors and events and their associated hierarchies. By way of example only, the IIoT Cloud Event Relationship and Ignition Engine (icERIE) 32 of the IIoT management apparatus 12 may identify these existing identify an existing or new relationships between one or more socio environment and economic factors and each of the plurality of dynamic multi-cloud events based on stored relationships between factors and events, although other manners to identify relationships, such as existing or new relationships, may be used. By way of example only, the socio environment and economic factors 64 may be retrieved from, for example, a government cloud in the multi-cloud environment 10 as shown in FIG. 3, although the factors and/or their correlations may be obtained in other manners. In the use case example above, the socio environment and economic factors 64 associated with China and Mexico are obtained by the IIoT Cloud Event Relationship and Ignition Engine (ic-ERIE) 32 of the IIoT management apparatus 12 from a government cloud in the multi-cloud environment 10 for each of China and Mexico. By way of example only, a socio environment and economic factor in China may relate to designated permitted time periods for production to comply with particular pollution and environment factor which can impact one or more events.

In step 408, the Socio Environment and Economic Factorization Unit (S2EU) 34 of the IIoT management apparatus 12 may communicate for example via order events sets for ignition communication channels 58 with the IIoT Cloud Event Relationship and Ignitions Engine (icERIE) 32 as shown in FIG. 3. Based on these and other communications as illustrated and described herein, the Socio Environment and Economic Factorization Unit (S2EU) 34 of the IIoT management apparatus 12 may derive one or more controls for each of the plurality of dynamic multi-cloud events based on the identified relationship between the one or more socio environment and economic factors 64 and each of the plurality of dynamic multi-cloud events. By way of example only, the socio environment and economic factor in China relating to designated permitted time periods for production to comply with particular pollution and environment factor would result in the Socio Environment and Economic Factorization Unit (S2EU) 34 of the IIoT management apparatus 12 may derive one or more controls for any of the plurality of dynamic multi-cloud events relating to production.

In step 410, the Socio Environment and Economic Factorization Unit (S2EU) 34 of the IIoT management apparatus 12 may determine when a change in the established hierarchy for the plurality of dynamic multi-cloud events in the overall event data is required based on the one or more derived controls. By way of example only, the Socio Environment and Economic Factorization Unit (S2EU) 34 of the IIoT management apparatus 12 may check whether the one or more conditions that are specified for an event are meeting the one or more identified socio environmental and economy factors 64 as well as completion of the overall event. If the conditions for any of event are not met then the Socio Environment and Economic Factorization Unit (S2EU) 34 of the IIoT management apparatus 12 needs to provide a variation which could trigger a need for a change in hierarchy or a new hierarchy, although with other types and/or numbers of factors. By way of example only, in the use case example above, if the example of the socio environment and economic factor in China relating to designated permitted time periods for production is analyzed and determined for example to not meet a production time schedule, then the Socio Environment and Economic Factorization Unit (S2EU) 34 of the IIoT management apparatus 12 may replace Event 1-A with Event 1-B with a different manufacturing location in Mexico.

Accordingly, if in step 410 the IIoT management apparatus 12 determines a change in the established hierarchy or a new hierarchy is required for the plurality of dynamic multi-cloud events is required, then the Yes branch is taken back to step 404 as described earlier. If in step 410 the IIoT management apparatus 12 determines a change in the established hierarchy or a new hierarchy for the plurality of dynamic multi-cloud events is not required, then the No branch is taken to step 412.

In step 412, the IIoT cloud governance model manager (icGMM) 36 of the IIoT management apparatus 12 may communicate for example via IIoT clouds control communications channels 60 with the Socio Environment and Economic Factorization Unit (S2EU) 34 as shown in FIG. 3. Based on these and other communications as illustrated and described herein, the IIoT cloud governance model manager (icGMM) 36 of the IIoT management apparatus 12 may generate a profile role for a participant at one or more of the plurality of IIoT participant devices 16(1)-16(n) in one or more of the different clouds of the multi-cloud environment 10 required for the plurality of dynamic multi-cloud events in the overall event data. In this particular example, the generated profile role may be a new profile role or an update of an existing profile role. In particular, the cloud governance model manager (icGMM) 36 of the IIoT management apparatus 12 may define the particular roles of each of the participants at one or more of the plurality of IIoT participant devices 16(1)-16(n) within the one or more different clouds and their authorizations, although other aspects of the roles could be generated or updated.

In step 414, the IIoT cloud governance model manager (icGMM) 36 of the IIoT management apparatus 12 may for example communicate via cloud event action plan messaging 62 with cloud event identification and publishing manager (EIPM) 28 as shown in FIG. 3. The IIoT cloud governance model manager (icGMM) 36 of the IIoT management apparatus 12 may generate action plan data once a change or new hierarchy is not required and by way of example the generated cloud event action plan messaging 62 may be transmitted to the cloud event identification and publishing manager (EIPM) 28. The generated action plan data may be based on the plurality of dynamic multi-cloud events in the overall event data, the derived one or more controls for each of the plurality of dynamic multi-cloud events, and a profiled role for one or more of the plurality of IIoT participant devices required for the plurality of dynamic multi-cloud events in the overall event data, although other types of events related data may be used to generate the action plan data.

In step 416, the cloud event identification and publishing manager (EIPM) 28 of the IIoT management apparatus 12 may disseminate via the generated IIoT Cloud Event Actions channel 66 the generated action plan data for implementation on the multi-cloud to one or more of the IIoT resources devices 14(1)-14(n) and/or the IIoT participant devices 16(1)-16(n) in one more of the multi-clouds environment 10. In particular, in this example the IIoT cloud governance model manager (icGMM) 36 of the IIoT management apparatus 12 may separate the generated action plan data into cloud specific action plan data for dissemination by the cloud event identification and publishing manager (EIPM) 28 to each of one or more of a plurality of clouds within the multi-cloud environment 10.

Accordingly, as illustrated by way of the examples herein this technology provides a number of advantages including methods, non-transitory computer readable media, and IIoT management apparatuses that provide an industrial internet of things control framework for dynamic multi-cloud events based on one or more socio economic and environment factors. This technology is able to identify socio economic and environmental conditions and policies that differ from as well as any updates or additions in real time to ensure adherence to these varying policy factors during globalization of an overall event, such as a product or other project. Additionally, this technology is able to monitor the availability of IIoT resources and the status of events in real time to effectively automate the management of synchronous and asynchronous events for overall events or products. It also provides insight of the qualitative measures of the corresponding overall events or products.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for providing an Industrial Internet-of-Things (IIoT) control framework for dynamic multi-cloud events, the method comprising:

generating, by a cloud event identification and publishing manager (EIPM) in an IIoT management apparatus, event data, based on a received overall event, for a plurality of dynamic multi-cloud events, wherein each of the plurality of dynamic multi-cloud events is associated with at least one of a plurality of IIoT resource devices and a plurality of IIoT participant devices;

establishing, by a heterogeneous multi cloud event controls and selection engine (ECSE) in the IIoT management apparatus, a current overall event hierarchy for the plurality of dynamic multi-cloud events in the overall event data based on the one or more constraints correlated with the each of the plurality of dynamic multi-cloud events using one or more conditions identified in the event data, one of a plurality of predefined and stored overall event hierarchies corresponding to one of a plurality of types of overall events; and at least one of a synchronous and asynchronous sequence that needs to be performed;

identifying, by an IIoT cloud event relationship and ignition engine (icERIE) in the IIoT management apparatus, a relationship between one or more socio environment and economic conditions and policies and each of the plurality of dynamic multi-cloud events and corresponding predefined event hierarchies;

deriving, by a socio environment and economic factorization unit (S2EU) in the IIoT management apparatus, one or more controls for each of the plurality of dynamic multi-cloud events in respect of the established overall event hierarchy based on the identified relationship between the one or more socio environment and economic conditions and policies and each of the plurality of dynamic multi-cloud events and the corresponding predefined event hierarchies, wherein the deriving one or more controls further comprises determining whether the one or more conditions identified in the event data is meeting the one or more socio environment and economic conditions and policies, wherein the socio-environment-and-economic conditions and policies comprises: (i) government regulations to operate each of IIoT resource devices and participant devices required for performing the overall event, and wherein the government regulations vary for different countries;

determining, by the S2EU in the IIoT management apparatus, a need for:

a new hierarchy or a change in the established hierarchy for the plurality of dynamic multi-cloud events in the overall event data, when the one or more conditions specified for the event data is not meeting the one or more socio-environment-and-economic conditions and policies required for completion of the overall event, wherein one or more new controls is derived for each of the plurality of dynamic multi-cloud events based on the new hierarchy or the change in the established hierarchy;

generating, by an IIoT cloud governance model manager (icGMM) in the IIoT management apparatus, action plan data for an action plan in a multi-cloud environment based on the plurality of dynamic multi-cloud events, the derived one or more new controls for each of the plurality of dynamic multi-cloud events, and a profiled participant role associated with one or more of the plurality of IIoT participant devices; and distributing, by the cloud event identification and publishing manager (EIPM) in the IIoT management apparatus, the generated action plan data for the action plan in the multi-cloud environment.

2. The method of claim 1, wherein the generating the action plan data is further based on the correlated one or more constraints with each of the plurality of dynamic multi-cloud events and the one or more constraints comprise one or more government regulatory constraints.

3. The method of claim 1, further comprising determining, by the Socio Environment and Economic Factorization Unit (S2EU) in the IIoT management apparatus, when a change in the established hierarchy for the plurality of dynamic multi-cloud events in the overall event data is required, based on the one or more derived controls.

4. The method of claim 1, further comprising generating, by the IIoT cloud governance model manager (icGMM) in the IIoT management apparatus, the profiled participant role associated with one or more of the plurality of IIoT participant devices, based on the plurality of dynamic multi-cloud events in the overall event data.

5. The method of claim 1, further comprising disseminating, by the cloud event identification and publishing manager (EIPM) in the IIoT management apparatus, the generated action plan data into cloud specific action plan data in the multi-cloud environment.

6. The method of claim 1, further comprising providing, by the cloud event identification and publishing manager (EIPM) in the IIoT management apparatus, an interface to enable generation of the plurality of dynamic multi-cloud events for the event data for the overall event.

7. An Industrial Internet-of-Things (IIoT) management apparatus, comprising:

one or more processors; and a memory comprising programmed instructions stored thereon and coupled to the one or more processors which are configured to be capable of executing the stored programmed instructions to:

generate by a cloud event identification and publishing manager (EIPM) event data, based on a received overall event, for a plurality of dynamic multi-cloud events, wherein each of the plurality of dynamic multi-cloud events is associated with at least one of a plurality of IIoT resource devices and a plurality of IIoT participant devices;

establish by a heterogeneous multi cloud event controls and selection engine (ECSE) a current overall event hierarchy for the plurality of dynamic multi-cloud events in the overall event data based on the one or more constraints correlated with the each of the plurality of dynamic multi-cloud events using one or more conditions identified in the event data, one of a plurality of predefined and stored overall event hierarchies corresponding to one of a plurality of types of overall events; and at least one of a synchronous and asynchronous sequence that needs to be performed;

identify by an IIoT cloud event relationship and ignition engine (icERIE) a relationship between one or more socio environment and economic conditions and policies and each of the plurality of dynamic multi-cloud events and corresponding predefined event hierarchies;

derive by a socio environment and economic factorization unit (S2EU) one or more controls for each of the plurality of dynamic multi-cloud events in respect of the established overall event hierarchy based on the identified relationship between the one or more socio environment and economic conditions and policies and each of the plurality of dynamic multi-cloud events and the corresponding predefined event hierarchies, wherein the deriving one or more controls further comprises determining whether the one or more conditions identified in the event data is meeting the one or more socio environment and economic conditions and policies, wherein the socio-environment-and-economic conditions and policies comprises: (i) government regulations to operate each of IIoT resource devices and participant devices required for performing the overall event, and wherein the government regulations vary for different countries;

determine a need for: a new hierarchy or a change in the established hierarchy for the plurality of dynamic multi-cloud events in the overall event data, when the one or more conditions specified for the event data is not meeting the one or more socio-environment-and-economic conditions and policies required for completion of the overall event, wherein one or more new controls is derived for each of the plurality of dynamic multi-cloud events based on the new hierarchy or the change in the established hierarchy;

generate by an IIoT cloud governance model manager (icGMM) action plan data for an action plan in a multi-cloud environment based on the plurality of dynamic multi-cloud events, the derived one or more controls for each of the plurality of dynamic multi-cloud events, and a profiled participant role associated with one or more of the plurality of IIoT participant devices; and distribute by the cloud event identification and publishing manager (EIPM) the generated action plan data for the action plan in the multi-cloud environment.

8. The apparatus of claim 7, wherein the generating the action plan data is further based on the correlated one or more constraints with each of the plurality of dynamic multi-cloud events and the one or more constraints comprise one or more government regulatory constraints.

9. The apparatus of claim 7, wherein the one or more processors are further configured to be capable of executing the stored programmed instructions to:

determine by the Socio Environment and Economic Factorization Unit (S2EU) when a change in the established hierarchy for the plurality of dynamic multi-cloud events in the overall event data is required, based on the one or more derived controls.

10. The apparatus of claim 7, wherein the one or more processors are further configured to be capable of executing the stored programmed instructions to:

generate by the IIoT cloud governance model manager (icGMM) the profiled participant role associated with one or more of the plurality of IIoT participant devices, based on the plurality of dynamic multi-cloud events in the overall event data.

11. The apparatus of claim 7, wherein the one or more processors are further configured to be capable of executing the stored programmed instructions to:

disseminate by the cloud event identification and publishing manager (EIPM) the generated action plan data into cloud specific action plan data in the multi-cloud environment.

12. The apparatus of claim 7, wherein the one or more processors are further configured to be capable of executing the stored programmed instructions to:

provide by the cloud event identification and publishing manager (EIPM) an interface to enable generation of the plurality of dynamic multi-cloud events for the event data for the overall event.

13. A non-transitory computer readable medium having stored thereon instructions for providing an Industrial Internet-of-Things (IIoT) control framework for dynamic multi-cloud events comprising executable code which when executed by one or more processors, causes the processors to:

generate by a cloud event identification and publishing manager (EIPM) event data, based on a received overall event, for a plurality of dynamic multi-cloud events, wherein each of the plurality of dynamic multi-cloud events is associated with at least one of a plurality of IIoT resource devices and a plurality of IIoT participant devices;

establish by a heterogeneous multi cloud event controls and selection engine (ECSE) a current overall event hierarchy for the plurality of dynamic multi-cloud events in the overall event data based on the one or more constraints correlated with the each of the plurality of dynamic multi-cloud events using one or more conditions identified in the event data, one of a plurality of predefined and stored overall event hierarchies corresponding to one of a plurality of types of overall events; and at least one of a synchronous and asynchronous sequence that needs to be performed;

identify by an IIoT cloud event relationship and ignition engine (icERIE) a relationship between one or more socio environment and economic conditions and policies and each of the plurality of dynamic multi-cloud events and corresponding predefined event hierarchies;

derive by a socio environment and economic factorization unit (S2EU) one or more controls for each of the plurality of dynamic multi-cloud events in respect of the established overall event hierarchy based on the identified relationship between the one or more socio environment and economic conditions and policies and each of the plurality of dynamic multi-cloud events and the corresponding predefined event hierarchies, wherein the deriving one or more controls further comprises determining whether of the one or more conditions identified in the event data is meeting the one or more socio environment and economic conditions and policies, wherein the socio-environment-and-economic conditions and policies comprises: (i) government regulations to operate each of IIoT resource devices and participant devices required for performing the overall event, and wherein the government regulations vary for different countries;

determine a need for: a new hierarchy or a change in the established hierarchy for the plurality of dynamic multi-cloud events in the overall event data, when the one or more conditions specified for the event data is not meeting the one or more socio-environment-and-economic conditions and policies required for completion of the overall event, wherein one or more new controls is derived for each of the plurality of dynamic multi-cloud events based on the new hierarchy or the change in the established hierarchy;

generate by an IIoT cloud governance model manager (icGMM) action plan data for an action plan in a multi-cloud environment based on the plurality of dynamic multi-cloud events, the derived one or more controls for each of the plurality of dynamic multi-cloud events, and a profiled participant role associated with one or more of the plurality of IIoT participant devices; and distribute by the cloud event identification and publishing manager (EIPM) the generated action plan data for the action plan in the multi-cloud environment.

14. The medium of claim 13, wherein the generating the action plan data is further based on the correlated one or more constraints with each of the plurality of dynamic multi-cloud events and the one or more constraints comprise one or more government regulatory constraints.

15. The medium of claim 13, wherein the executable code, when executed by the one or more processors, further causes the one or more processors to:

determine by the Socio Environment and Economic Factorization Unit (S2EU) when a change in the established hierarchy for the plurality of dynamic multi-cloud events in the overall event data is required, based on the one or more derived controls.

16. The medium of claim 13, wherein the executable code, when executed by the one or more processors, further causes the one or more processors to:

generate by the IIoT cloud governance model manager (icGMM) the profiled participant role associated with one or more of the plurality of IIoT participant devices, based on the plurality of dynamic multi-cloud events in the overall event data.

17. The medium of claim 13, wherein the executable code, when executed by the one or more processors, further causes the one or more processors to:

disseminate by the cloud event identification and publishing manager (EIPM) the generated action plan data into cloud specific action plan data in the multi-cloud environment.

* * * * *